(12) United States Patent
Frantz

(10) Patent No.: US 8,313,119 B2
(45) Date of Patent: Nov. 20, 2012

(54) COMBINED TRAILER HITCH COUPLER GUIDE AND SECUREMENT ASSEMBLY AND METHOD

(76) Inventor: Donald R. Frantz, New Berlin, WI (US)

(*) Notice: Subject to any disclaimer, the term of this patent is extended or adjusted under 35 U.S.C. 154(b) by 49 days.

(21) Appl. No.: 13/024,504

(22) Filed: Feb. 10, 2011

(65) Prior Publication Data

US 2012/0032416 A1 Feb. 9, 2012

Related U.S. Application Data

(60) Provisional application No. 61/302,982, filed on Feb. 10, 2010.

(51) Int. Cl.
*B60D 1/36* (2006.01)
*B60D 1/60* (2006.01)
(52) U.S. Cl. ............................ 280/507; 280/477
(58) Field of Classification Search ................ 280/507, 280/477
See application file for complete search history.

(56) References Cited

U.S. PATENT DOCUMENTS

| | | |
|---|---|---|
| 5,465,992 A | 11/1995 | Anderson |
| 5,697,630 A | 12/1997 | Thompson et al. |
| 5,725,232 A | 3/1998 | Fleming |
| 6,234,510 B1 | 5/2001 | Hammons |
| 6,802,523 B1 | 10/2004 | Profitt |
| 6,932,376 B1 | 8/2005 | Profitt |
| 6,969,085 B2 * | 11/2005 | Causey, Jr. .......... 280/507 |
| D563,838 S | 3/2008 | McCowan |
| 7,347,441 B2 | 3/2008 | Rosario |
| 7,568,717 B2 | 8/2009 | Ayoub |
| 2007/0114760 A1 | 5/2007 | Hegefeld |

* cited by examiner

*Primary Examiner* — Tony Winner
(74) *Attorney, Agent, or Firm* — Joseph S. Heino; Patrick M. Bergin

(57) ABSTRACT

An assembly has a bracket attached to the hitch ball mount of a towing vehicle. The bracket is used with a first removable item which allows for the alignment of a trailer coupler with the hitch ball. Once the coupler has been aligned and attached to the hitch ball, the first removable item can be removed. The first accessory item is then replaced by a second removable item which allows for securement of the coupler to the hitch ball and prevents removal of the coupler from the hitch ball. The alignment and guide structure of the first removable item is interchangeable with the securement structure of the second removable item. The second removable item further provides structure for locking the second removable item to the bracket. A method for guiding the coupler toward alignment with the hitch ball and for securing the coupler to the hitch ball is also provided.

13 Claims, 10 Drawing Sheets

BALL MOUNT AND BRACKET ASSEMBLY

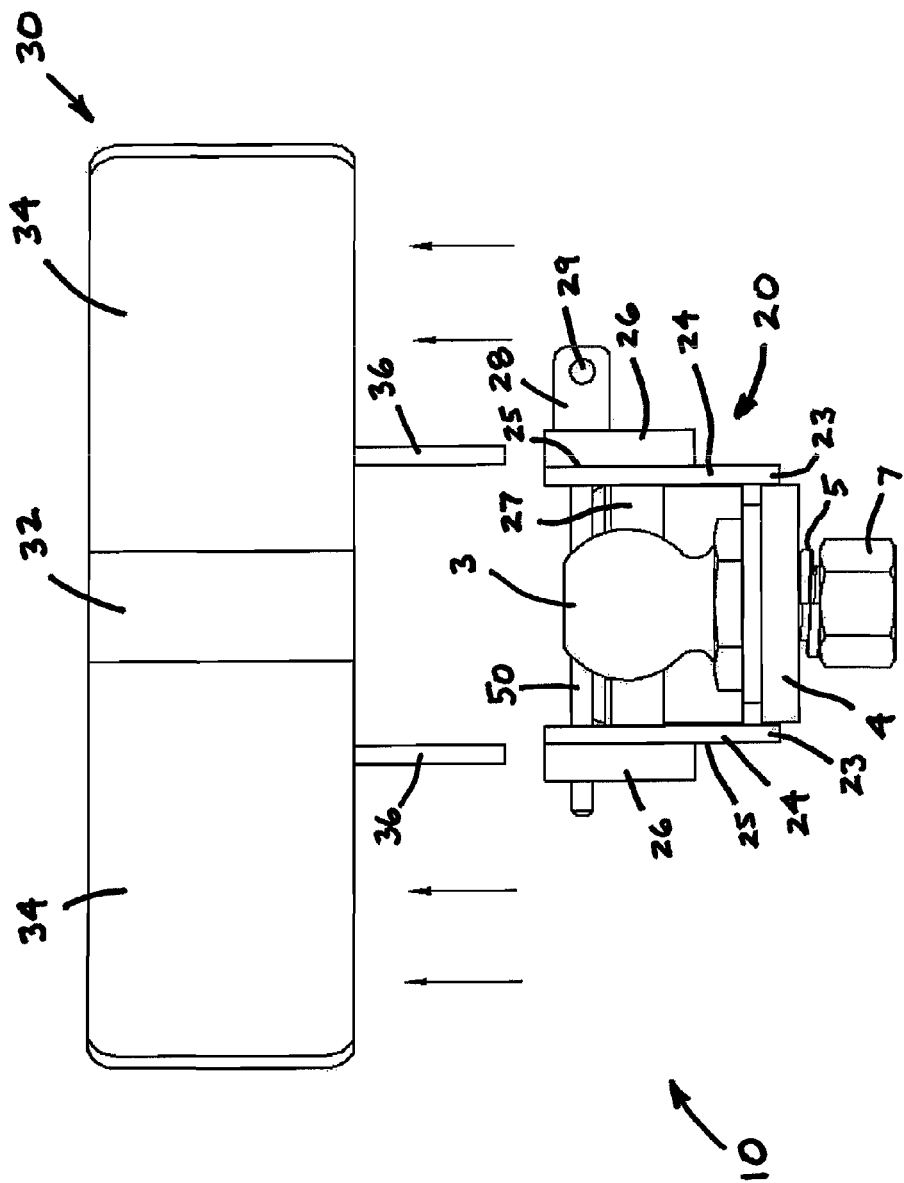

COMBINED TRAILER HITCH COUPLER GUIDE AND SECUREMENT ASSEMBLY AND METHOD

This application claims the benefit of U.S. Provisional Application No. 61/302,982, filed Feb. 10, 2010.

FIELD OF THE INVENTION

The present invention relates generally to hitch assemblies and methods that are used for connecting a towed vehicle, such as a trailer, to a towing vehicle. More specifically, it relates to a combined assembly that is attachable to the hitch receiver of the towing vehicle, the assembly being configured to align and guide the trailer hitch coupler with the hitch ball of the hitch receiver as the vehicle is backed into the trailer hitch and alternatively configured to securely maintain the captured trailer hitch coupler onto the hitch ball following alignment and attachment of the trailer hitch coupler to the hitch ball. The alignment and guide means is easily and readily interchangeable with the securement means. It also relates specifically to the method that allows for the quick and easy replacement of the elements that are used in the combined assembly.

BACKGROUND OF THE INVENTION

Trailer hitch assemblies are well known in the art. Such assemblies are used with towing vehicles, such as cars and trucks, to allow them to pull towed vehicles, such as boat trailers, pop-up campers and the like, behind them. In one very common assembly, the towing vehicle is fitted with a hitch assembly having a tow hitch, which is a square-shaped hollow receiver tube mounted to the chassis of a towing vehicle at the rear of the vehicle. A portion of a ball mount is then inserted into the hollow of the receiver tube with the remaining portion of the ball mount extending rearwardly of the towing vehicle. That is, the ball mount includes a bar that fits into the receiver that is attached to the vehicle and is secured to the receiver, typically by pinning it. The ball mount includes a hitch ball that is attached to it and the bar of the ball mount may drop down to get the ball closer to the ground so that the towed vehicle, or trailer, will ride more or less level.

The towed vehicle, or trailer, is then fitted with a device that is used to secure the trailer to the towing vehicle. This is known as the trailer "tongue" or trailer "coupler" which captures the hitch ball and secures the towed vehicle to the towing vehicle. This forms an effective "ball and socket" connection to allow for relative movement between the towing vehicle and the towed vehicle, or trailer, while towing over a road surface.

In the hitch assembly described above, the hitch ball is typically removably attached to the ball mount. In this type of assembly, the hitch ball includes an integrally-formed ball that extends above the ball mount, a flange of some sort disposed immediately below the ball, a shank that extends through an aperture defined within the ball mount, and a threaded shank portion that extends below the ball mount. The threaded shank portion is used to secure the hitch ball to the ball mount by means of a like-threaded fastener, such as a hex nut.

Certain configurations have been devised to allow for the alignment of the coupler with the hitch ball prior to the coupler actually being attached to the hitch ball. That is, as the towing vehicle backs towards the somewhat stationary trailer, the driver may be able to accurately align the coupler with the hitch ball if a spotter assists the driver. Where the driver is not assisted, the blind spot behind the vehicle makes accurate alignment virtually impossible. The best that the driver can do is get the hitch ball as close as possible to the coupler and then manually rotate the coupler-end of the trailer into position. Some prior art devices have been described for assisting the driver with this type of maneuver. For example, U.S. Pat. No. 5,697,630 to Thompson et al. discloses and claims a hitching assembly having a base plate portion and a hitching portion with guide plates, the hitching portion being insertable by means of a tongue portion that fits into a slotted mounting socket. A similar device is disclosed and claimed in U.S. Pat. No. 6,234,510 to Hammons.

Similarly, once the coupler has been secured to the hitch ball, certain devices are used to prevent accidental or intentional trailer detachment, such as by theft. For example, the typical coupler incorporates a locking mechanism that can be augmented by use of a separate locking device. Other devices have been described for placing the separate locking device on the hitch ball mount. For example, U.S. Pat. No. 6,802,523 to Profitt discloses and claims a safety fastener having a base that fits over the beam of a hitch ball mount. The base carries a collar for a vertical fastener arm. Another device is disclosed and claimed in U.S. Pat. No. 6,932,376 to Profitt.

The prior art references are not disclosed or claimed to be interchangeable or even usable with a single base member. To the contrary, each requires a specifically-configured base member.

SUMMARY OF THE INVENTION

In the view of this inventor, what is needed is a combined assembly whereby a single base or bracket member can be used interchangeably with two separate accessory items to accomplish both the alignment functionality and the securement functionality that is described above. The prior art does not disclose or suggest the advantages that are provided by such an assembly. The present invention does.

More specifically, the present invention provides an assembly whereby a single base or bracket can be attached to the hitch ball mount of a towing vehicle. The base or bracket is then used in conjunction with a first removable accessory item which allows for the alignment of a trailer coupler with the hitch ball. Once the coupler has been properly aligned and then attached to the hitch ball, the first accessory item can be easily and quickly removed from the base or bracket. The first accessory item is then quickly and easily replaced by a second removable accessory item which allows for securement of the coupler to the hitch ball, thus preventing accidental or intentional subsequent removal of the coupler from the hitch ball when such is desired or required. In this configuration, it will be appreciated that the alignment and guide means of the first accessory item is easily and readily interchangeable with the securement means of the second accessory item in the present invention. The second removable accessory item further provides means for locking the second accessory item to the base or bracket to provide further structure for preventing the accidental or intentional removal of the second accessory item from the assembly of the present invention.

The foregoing and other features of the assembly of the present invention will be apparent from the detailed description that follows.

BRIEF DESCRIPTION OF THE DRAWINGS

FIG. 3 is a rear elevational view of the bracket and guide means shown in FIG. 2.

DETAILED DESCRIPTION OF THE INVENTION

Figure 1:
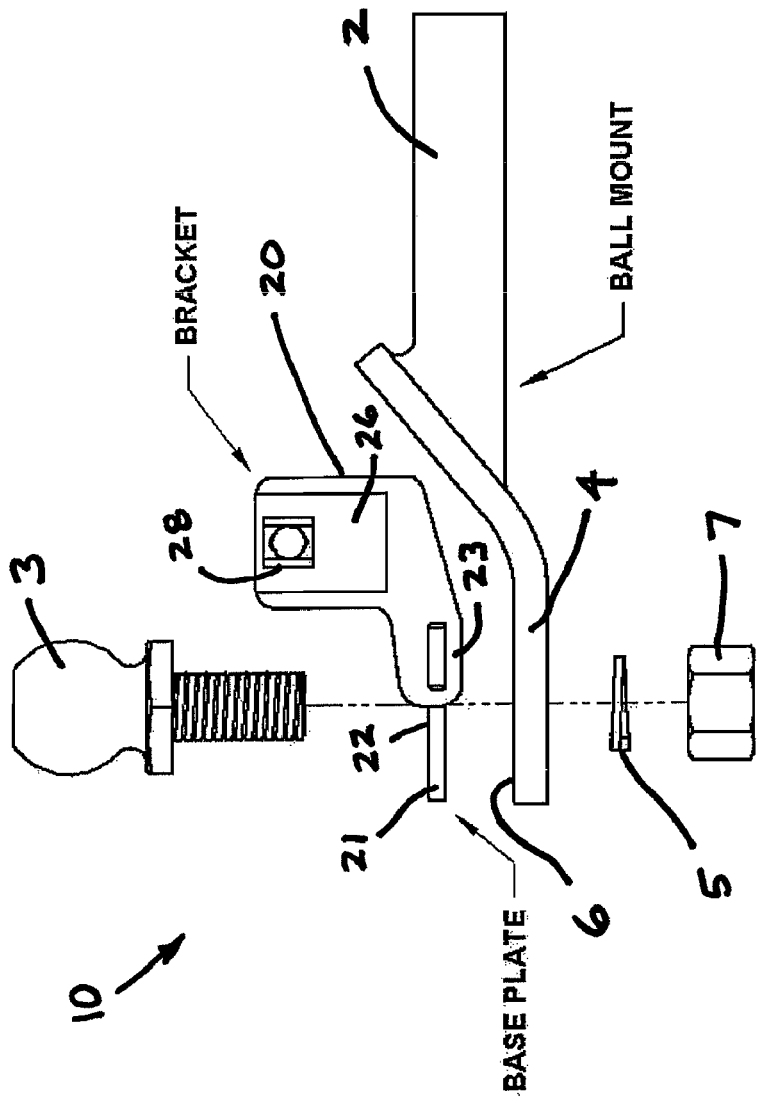
FIG. 1 is a right side elevational view of a preferred embodiment of the base or bracket that is used in the assembly of the present invention, the bracket being used with a conventional ball mount and hitch ball assembly.

Referring now to the drawings in detail, wherein like numbered elements correspond to like elements throughout, FIG. 1 is a right side elevational view showing the bracket 20 used in the assembly of the present invention, the assembly being generally identified 10. The bracket 20 is secured to a hitch ball mount 2, the hitch ball mount 2 having a rearward portion 4 and the rearward portion 4 having a top surface 6. The bracket 20 is retained in position by being interposed between the hitch ball 3 and the top surface 6 of the rearward portion 4 of the hitch ball mount 2, the hitch ball 3 being secured within a mounting hole (not shown) defined in both the bracket 20 and the rearward portion of the hitch ball mount 2 with a lock washer 5 and a threaded nut 7.

As shown in FIG. 3, the bracket 20 includes a planar horizontal member 22 that extends between a pair of opposing and generally L-shaped vertical members 24. When attached as intended, each vertical member 24 is disposed to one side of the rearward portion 4 of the hitch ball mount 2. At the lowermost portion 23 of each vertical member 24, the vertical members 24 extend slightly past the horizontal member 22 to prevent rotation or pivoting of the bracket 20 about the ball mount 2. The horizontal member 22 has a rearward portion 21 which forms that part of the member 22 that is captured by the hitch ball 3. See, for example, FIGS. 6 and 8. This portion 21 has an aperture (not shown) defined in it such that the lowermost threaded portion of the hitch ball 3 can pass through it.

Figure 2:
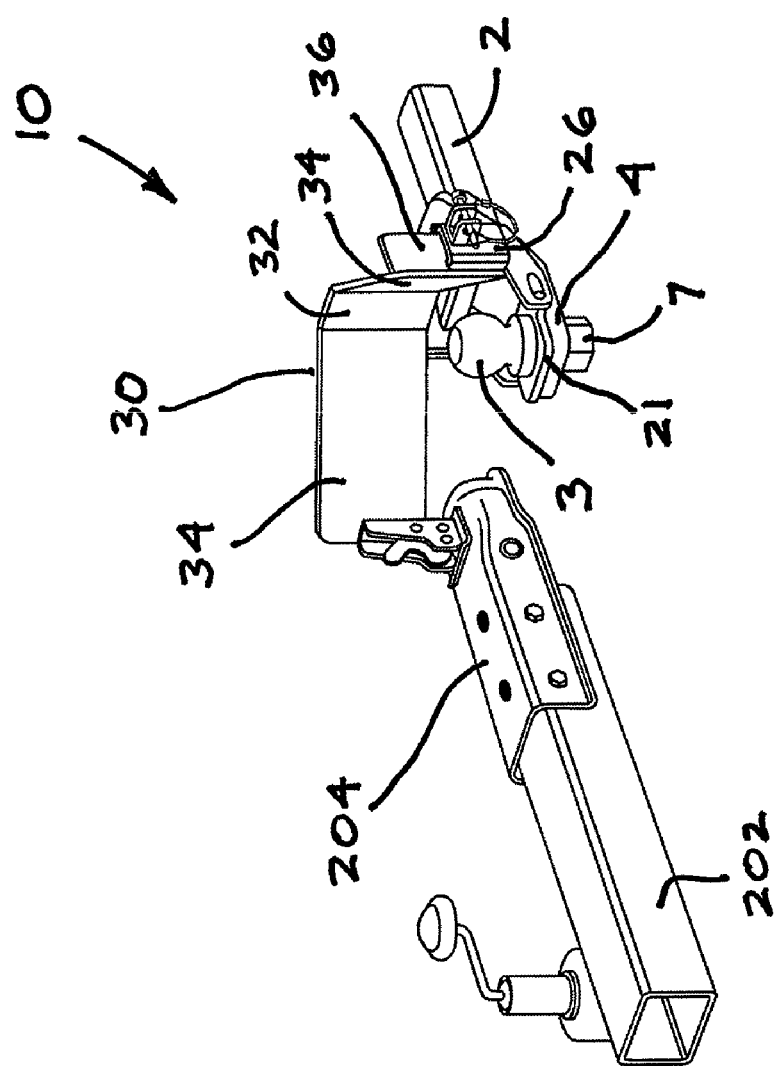
FIG. 2 is a rear, top and right side perspective view of the bracket of the assembly as shown in FIG. 1 as used with a trailer hitch guide means.

Each vertical member 24 of the guide means 20 includes an outer face 25 to which is mounted a receiver 26, each receiver having a vertically-disposed aperture (not shown) in it and each aperture being substantially rectangular shape in horizontal cross-section. FIG. 2 shows the bracket 20 in a perspective view that also illustrates the hitch ball mount 2 and the coupler 204 of the trailer 200 (see FIGS. 4A and 4B) that is mountable onto the hitch ball 3. It is also to be noted that each receiver 26 is positioned above the vertical plane formed by the horizontal portions 21, 22 of the bracket 20. That is, neither receiver 26 extends below the horizontal portions 21, 22 of the bracket 20. See FIG. 3. A secondary support bar 27 extends between each vertical member 24 for added stability and to prevent the coupler 204 from contacting the hitch ball mount 2. The secondary support bar 27 is angled slightly relative to the vertical and the horizontal.

Extending outwardly from the receiver 26 to one side of the bracket 20 is a lock means 28, the lock means having aligned apertures 29 defined in it. It is also to be understood that the receivers 26 and the vertical members 24 of the bracket 20 have aligned apertures (not shown) defined within them, the axis of the apertures being horizontal. The purpose and function of this structure will be apparent later in this detailed description.

Referring again to both FIGS. 2 and 3, they also show a trailer hitch guide means 30 that is removably mountable within the bracket 20. Specifically, and when viewed from the top, the guide means 30 is a generally V-shaped structure having a centrally-disposed vertical plate 32. To either side of the vertical portion 32 is a vertical guide plate 34. Forward of the vertical guide plates 34 is a pair of vertically-disposed support members 36. In cross-section, the support members 36 are rectangular-shaped structures that substantially match and are aligned with the horizontal cross-sectional profile of the vertical apertures of the receivers 26. In that configuration, each support member 36 is removably receivable by and slidable movable within the aperture of a receiver 26. In this way, the guide means 30 can be inserted into the bracket 20 easily and quickly when such is desired or required by the user. It has also been determined by this inventor that the rectangular shape of the vertical apertures of the receivers 26 and the rectangular shape of the support members 36 add strength or "rigidity" to the assembly 10. That is, the rectangular shape of those structures, as shown, decreases the tendency for them to "twist" when engaged, thus resisting any torsional forces that might be applied against the guide plates 34, particularly when the coupler 204 impacts the outer edge of the plate 34 initially and then slides along it until it "centers."

Figure 4A:
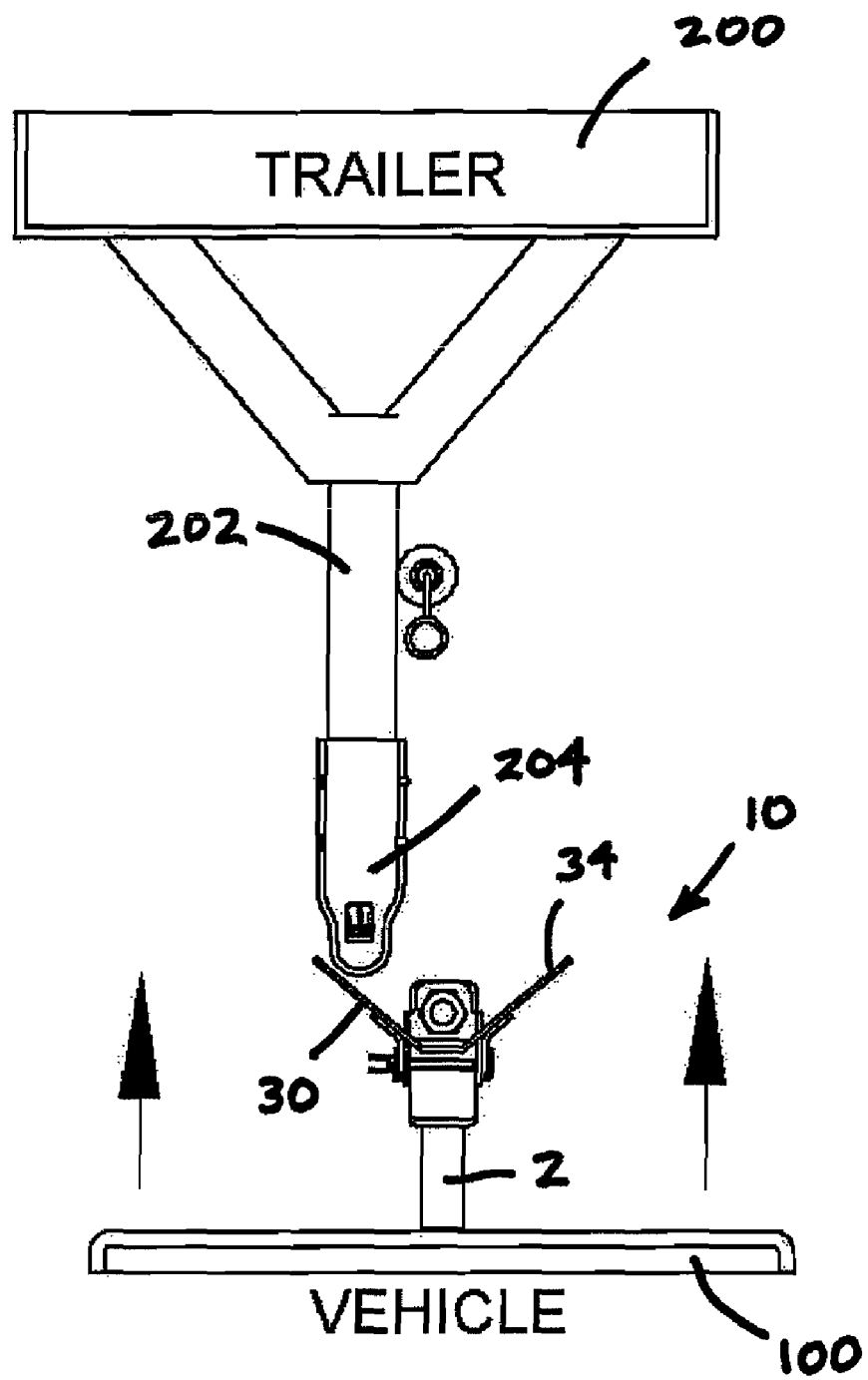
FIG. 4A is a top plan view of the bracket and guide means illustrated in FIGS. 2 and 3 and showing the assembly in application where the towing vehicle is backing into a trailer and trailer hitch but is not centered.
Figure 4B:
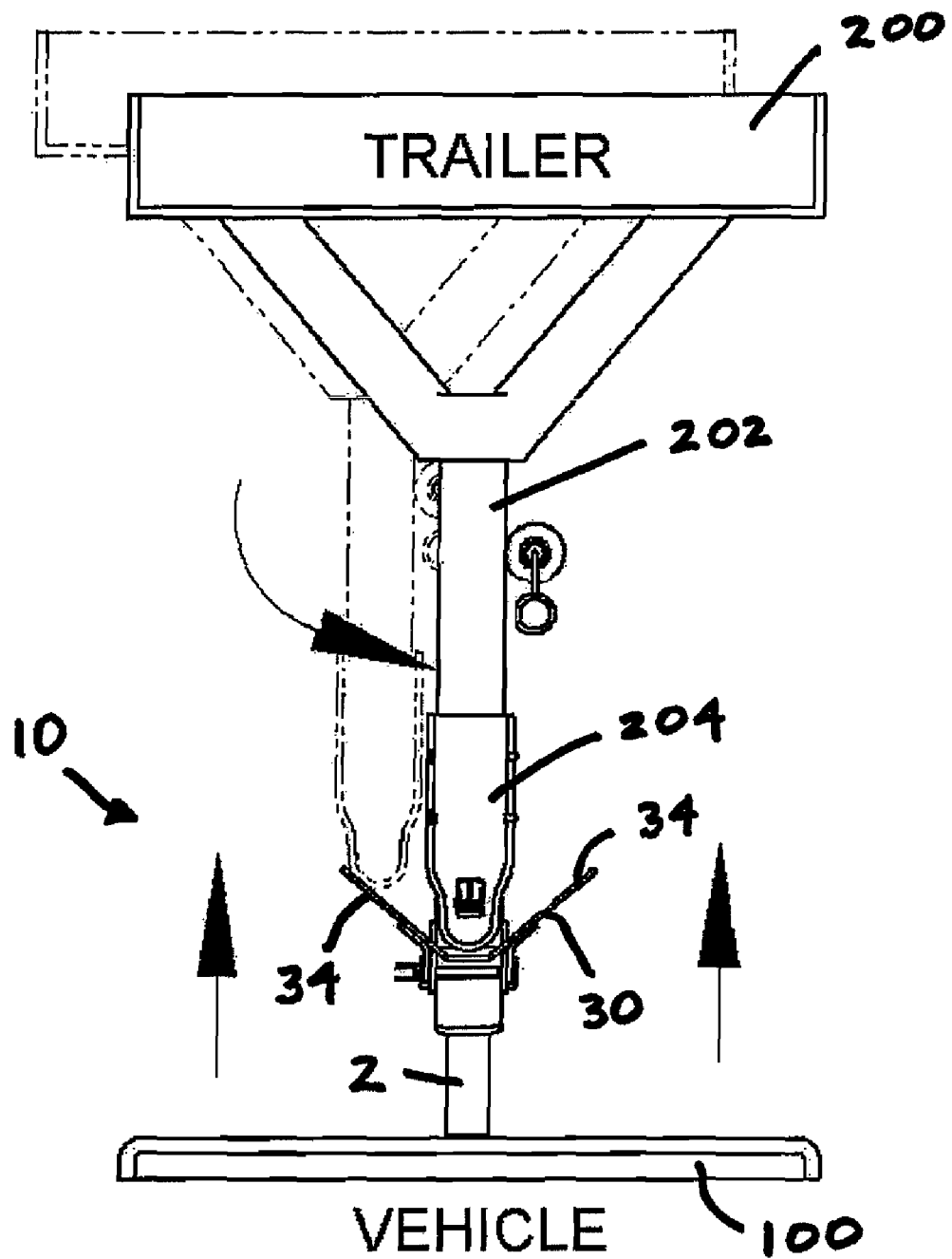
FIG. 4B is a view similar to FIG. 4A but showing the trailer hitch in centered alignment with the ball mount.
Figure 5:
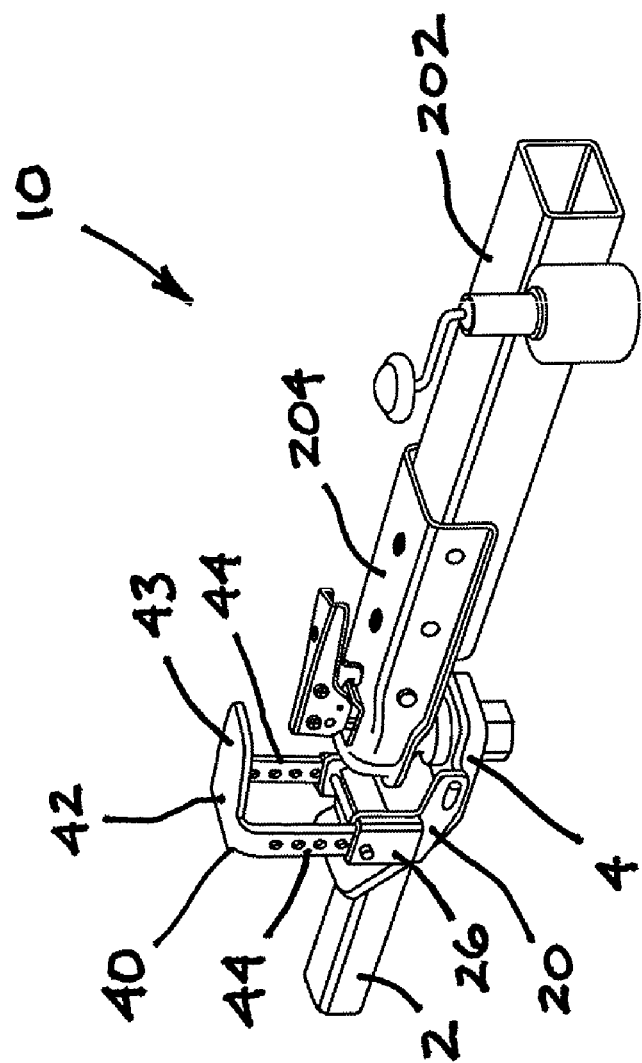
FIG. 5 is a rear, top and left side perspective view of the bracket of the assembly as shown in FIG. 1 as used with a trailer hitch securement means.

Referring now to FIGS. 4A and 4B, they show the hitch ball mount 2 that is secured to the rearward-most portion of a towing vehicle 100 and the coupler 204 that is secured to a beam 202 that extends forwardly from a trailer 200. In application, the user would mount the guide means 30 to the bracket 20 and would back the vehicle 100 towards the trailer 200 with the goal of lining up the coupler 204 with the hitch ball 3. It is most often the case that precise alignment is not achieved initially, as is shown in FIG. 4A. By use of the guide means 30, however, the guide plates 34 of the guide means 30 force the coupler 204 to "center" with the hitch ball and effectively "guide" the coupler 204 into proximate alignment with the hitch ball 3. The user would then stop the rearward movement of the vehicle 100 and secure the coupler 204 to the hitch ball 3 in conventional fashion. The guide means 30 can then be quickly and easily removed from the bracket 20 by the user.

Figure 8:
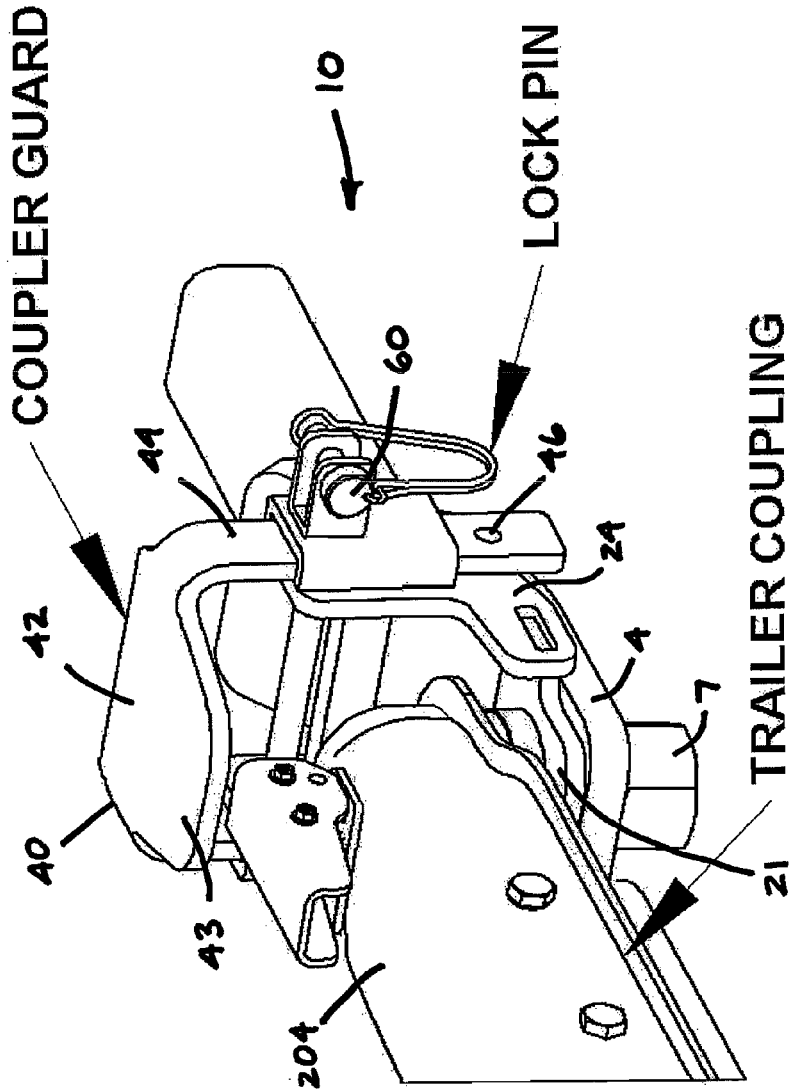
Figure 9:
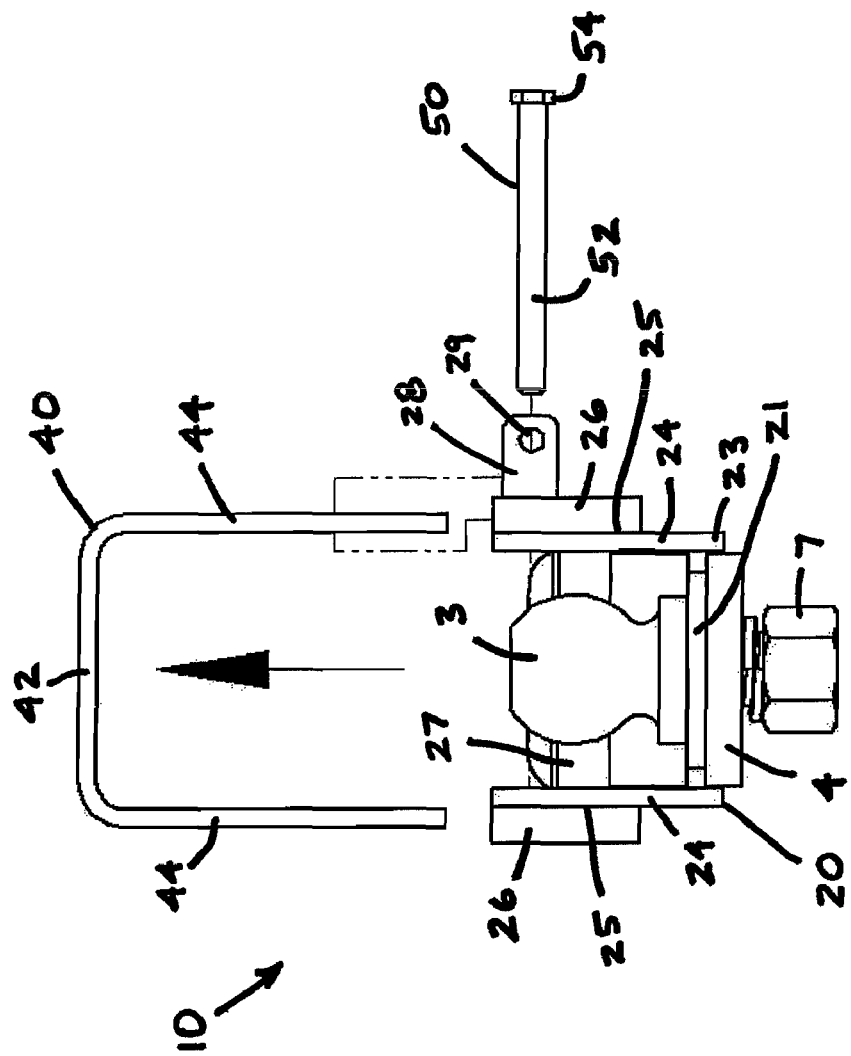

Referring now to FIGS. 5-9, they show the second accessory item, the trailer coupler guard means 40, which is used with the bracket 20 of the combined assembly 10 of the present invention. As shown in FIG. 9, it will be seen that the guard means 40 comprises a generally inverted U-shaped structure having a central horizontal portion 42 that is integrally formed with opposing vertical side support members 44. The horizontal portion 42 further comprises a shelf 43 that extends over the coupler 204 when the guard means 40 is used as intended. The shelf 43 is used to maintain position of the guard means 40 over the forwardmost portion of the coupler 204 and prevent unintended detachment of the coupler 204, such as by theft.

In cross-section, the support members 44 are rectangular-shaped structures that substantially match the horizontal cross-sectional profile of the vertical apertures of the receivers 26. In that configuration, each support member 44 is removably receivable by and slidable movable within the aperture of a receiver 26. In this way, the guard means 40 can be inserted into the bracket 20 easily and quickly when such is desired or required by the user after the guide means 30 is removed.

Figure 6:
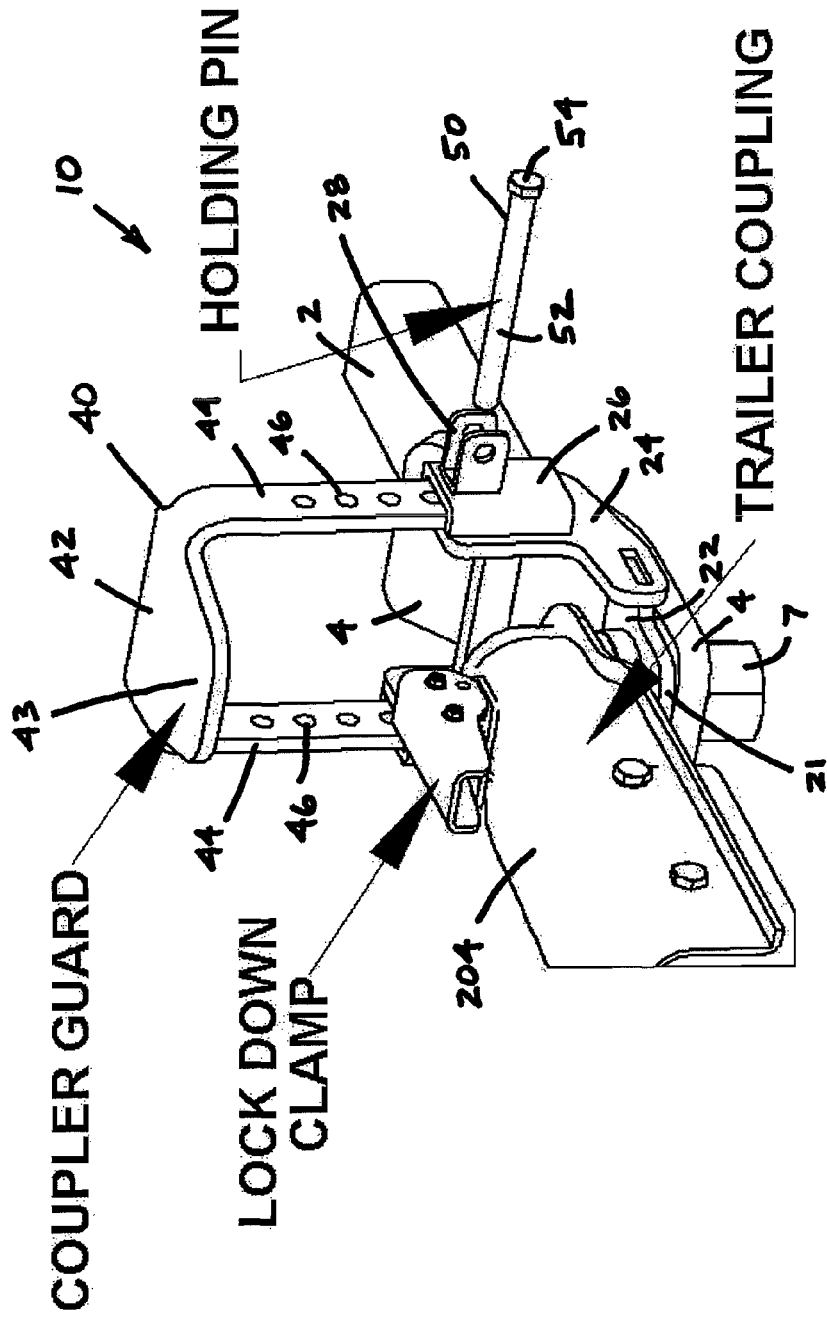
FIG. 6 is a rear, top and right side perspective view of the bracket and trailer hitch.
Figure 7:
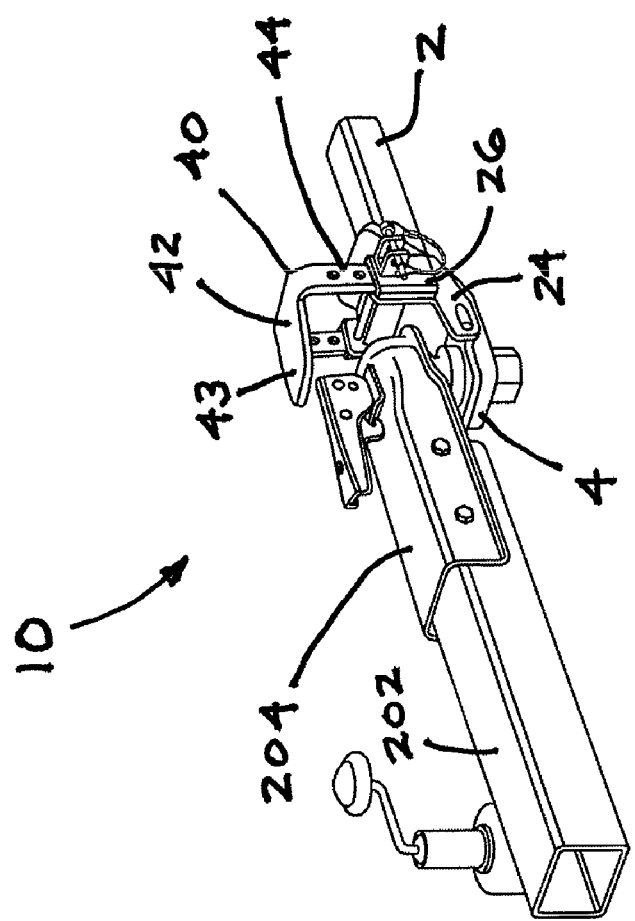

As shown in FIGS. 6 and 8, it will be seen that the vertical support members 44 include a plurality of apertures 46, the apertures 46 of one support member 44 aligning horizontally with the apertures 46 of the opposing member 44. In this configuration, and once the coupler guard means 40 is properly positioned relative to the horizontal, the shaft 52 of a holding pin 50 can be insert through the aligned apertures 46 of the vertical support members 44 and through the like aligned apertures of the bracket side members 24. The holding pin 50 has a head 54 to prevent the pin 50 from passing through the apertures. At that side of the bracket 20 that the head 54 of the pin 50 is located, a lock pin 60 can be inserted through the apertures 29 of the lock means 28 to insure that the pin 50 is retained in proper position. It is also to be understood that the lock pin 60 could be replaced by another locking device.

In accordance with the foregoing, it will be understood that an assembly has been provided that allows use of a single bracket that can be attached to the hitch ball mount of a towing vehicle and that can be used in conjunction with a first removable accessory item that allows for the alignment of a trailer coupler with the hitch ball. Once the coupler has been attached to the hitch ball, the first accessory item can be easily and quickly removed from the bracket and then quickly and easily replaced by a second removable accessory item that allows for securement of the coupler to the hitch ball, thus preventing accidental or intentional subsequent removal of the coupler from the hitch ball. The second accessory item also provides means for locking the second accessory item to the base or bracket.

The principles of this invention having been fully explained in connection with the foregoing, I hereby claim as my invention:

1. An assembly for use with a hitch receiver of a towing vehicle, the hitch receiver having a hitch ball mount and a hitch ball, and with a coupler of a towed trailer, the assembly comprising:
   a bracket attached to the hitch ball mount, the bracket comprising:
      a pair of opposing vertical members, each vertical member comprising an outer face;
      a planar horizontal member that extends between the vertical members; and
      a receiver mounted to the outer face of each vertical member, each receiver comprising a vertically-disposed aperture and each aperture being substantially rectangular in horizontal cross section;
   a trailer hitch guide means; and
   a trailer coupler guard means;
   wherein the trailer hitch guide means and the trailer coupler guard means are each configured to be interchangeably received by the bracket.

2. The assembly of claim 1 wherein the trailer hitch guide means comprises:
   a generally V-shaped structure having a centrally-disposed vertical plate and a guide plate disposed to either side of the vertical place; and
   a pair of vertical support members, each vertical support member being attached to a guide plate;
   wherein each vertical support member is removably receivable within a receiver aperture.

3. The assembly of claim 1 wherein the trailer coupler guard means comprises:
   a generally inverted U-shaped structure comprising a central horizontal portion and integrally-formed opposing vertical side support members;
   wherein the central horizontal portion comprises a shelf that extends over the coupler; and
   wherein each vertical side support member is removably receivable within a receiver aperture.

4. The assembly of claim 3 wherein the guard means further comprises:
   a plurality of apertures defined within each of the vertical side support members, the apertures of one support member aligning generally horizontally with the apertures of the opposing member;
   a plurality of apertures defined in the vertical members and the receivers of the bracket, the apertures being aligned generally horizontally; and
   a holding pin that is insertable through a plurality of aligned apertures of the vertical side support members and the aligned apertures of the vertical members and the bracket receivers.

5. The assembly of claim 4 further comprising a lock means for retaining the holding pin in the assembly.

6. An assembly for use with a hitch receiver of a towing vehicle, the hitch receiver comprising a hitch ball mount having a rearward portion and the rearward portion having a top surface, and a hitch ball, and with a coupler of a towed trailer, the assembly comprising:
   a bracket attached to the top surface of the rearward portion of the hitch ball mount, a portion of the bracket being interposed between such top surface and the hitch ball, the bracket comprising:
      a pair of opposing and generally L-shaped vertical members, each vertical member comprising an outer face;
      a planar horizontal member that extends between the vertical members;
      a receiver mounted to the outer face of each vertical member, each receiver being positioned above the planar horizontal member and comprising a vertically-disposed aperture and each aperture being substantially rectangular in horizontal cross section; and
      a support bar that extends between the vertical members generally at the point of the receivers;
   a trailer hitch guide means; and
   a trailer coupler guard means;
   wherein the trailer hitch guide means and the trailer coupler guard means are each configured to be received by the bracket.

7. The assembly of claim 6 wherein the trailer hitch guide means comprises:
   a generally V-shaped structure having a centrally-disposed vertical plate and a guide plate disposed to either side of the vertical place; and
   a pair of vertical support members, each vertical support member being attached to a guide plate;
   wherein each vertical support member is removably receivable within a receiver aperture.

8. The assembly of claim 6 wherein the guard means further comprises:
   a plurality of apertures defined within each of the vertical side support members, the apertures of one support member aligning generally horizontally with the apertures of the opposing member;

a plurality of apertures defined in the vertical members and the receivers of the bracket, the apertures being aligned generally horizontally; and a holding pin that is insertable through a plurality of aligned apertures of the vertical side support members and the aligned apertures of the vertical members and the bracket receivers.

9. The assembly of claim 8 further comprising a lock means for retaining the holding pin in the assembly.

10. A method for guiding a coupler of a towed trailer toward alignment with a hitch receiver of a towing vehicle, the hitch receiver having a hitch ball mount and a hitch ball, and for securing the coupler to the hitch ball, the method comprising the steps of:

providing a bracket that is attached to the hitch ball mount, the bracket providing step comprising the step of providing a bracket that comprises a pair of opposing vertical members, each vertical member comprising an outer face; a planar horizontal member that extends between the vertical members; and a receiver mounted to the outer face of each vertical member, each receiver comprising a vertically-disposed aperture and each aperture being substantially rectangular in horizontal cross section;

providing a trailer hitch guide means;

attaching the guide means to the bracket;

moving the coupler and the hitch ball toward each other;

attaching the coupler to the hitch ball;

removing the guide means from the bracket;

providing a trailer coupler guard means; and attaching the trailer coupler guard means to the bracket 11. The method of claim 10 wherein said trailer coupler guard means providing step comprises the step of providing a coupler guard means that comprises a generally inverted U-shaped structure having a central horizontal portion and integrally-formed opposing vertical side support members; wherein the central horizontal portion comprises a shelf that extends over the coupler; and wherein each vertical side support member is removably receivable within a receiver aperture.

12. The method of claim 10 wherein said trailer coupler guard means providing step comprises the step of providing a guard means that comprises a plurality of apertures defined within each of the vertical side support members, the apertures of one support member aligning generally horizontally with the apertures of the opposing member; a plurality of apertures defined in the vertical members and the receivers of the bracket, the apertures being aligned generally horizontally; and a holding pin that is insertable through a plurality of aligned apertures of the vertical side support members and the aligned apertures of the vertical members and the bracket receivers.

13. The method of claim 12 further comprising the step of providing a lock means for retaining the holding pin in the assembly.

\* \* \* \* \*